United States Patent [19]
Thomas

[11] 3,879,886
[45] Apr. 29, 1975

[54] FISH HOOK WITH INTEGRAL BAIT CLIP

[76] Inventor: Mit Thomas, 609 N. Tyler, Dallas, Tex. 75208

[22] Filed: July 17, 1973

[21] Appl. No.: 360,529

[52] U.S. Cl. .................................. 43/44.6; 43/44.8
[51] Int. Cl. ............................................ A01k 83/06
[58] Field of Search .................. 43/44.6, 44.4, 44.8

[56] References Cited
UNITED STATES PATENTS

| | | | |
|---|---|---|---|
| 564,517 | 7/1896 | Hastings | 43/44.8 |
| 2,215,612 | 9/1940 | Hathaway | 43/44.6 |
| 2,605,580 | 8/1952 | Moore | 43/44.8 |
| 2,795,885 | 6/1957 | Imberti | 43/44.4 |
| 2,962,834 | 12/1960 | Stinson | 43/44.6 |
| 3,400,484 | 9/1968 | Beard | 43/44.6 |

*Primary Examiner*—Louis G. Mancene
*Assistant Examiner*—Daniel J. Leach
*Attorney, Agent, or Firm*—T. D. Copeland, Jr.

[57] ABSTRACT

A standard fish hook has been modified to include an integral bait clip in the form of semi-circular rings that hold live bait such as worms, insects and others snugly adjacent the hook without piercing the bait and thus shortening its life and activity. The bait clip may be permanently attached to the hook as by welding, or it may be temporarily attached by clipping onto the hook and it is adapted to employ single or multiple bait.

5 Claims, 10 Drawing Figures

FISH HOOK WITH INTEGRAL BAIT CLIP

BACKGROUND OF THE INVENTION

1. Field of the Invention

This invention relates generally to fish hooks and more particularly to fish hooks adapted to contain live bait when in use.

2. Statement of the Prior Art

The prior art discloses many types of fish hooks for receiving live bait, and some of these include fish hooks that are made of a plurality of parts such as those shown in U.S. Pat. Nos. 2,585,494 and 3,505,756. It is not however known that the prior art has disclosed a single piece fish hook that includes the improvements contained herein.

SUMMARY OF THE INVENTION

A principal object of this invention is to provide a simple, easy to use live bait containing fish hook that will extend the life of the bait employed.

Another object is to provide a method and structure for converting a standard one-piece barbed fish hook that is normally baited with live bait by piercing the bait during the attachment to a fish hook that holds the live bait without piercing.

A further object is to provide a fish hook of the type described herein that is integrally and permanently adapted to hold bait by clamping.

An additional object is to provide a method and structure for quickly and temporarily modifying a standard onepiece fish hook so that is may maintain live bait by a nondestructive technique.

And yet another object is to provide a bait holding clamp that permits a live bait to be securely held undamaged in a spring loaded arrangement.

A still further object is to provide a simple, economical, easy to make and easy to use device that will prolong the life and activity of live bait for fishing purposes.

DESCRIPTION OF ILLUSTRATED EMBODIMENTS

This invention is particularly adapted to the construction with stainless steel, hard brass, or plated spring steel, and the spring clip sections may be made of various sizes for different types of fish hooks. The snap-on type bait clamp of FIGS. 8-10 may also be made of plastic.

Figure 1:
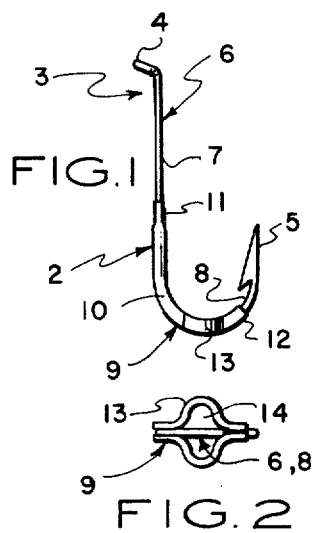
FIG. 1 is a side elevational view of a single bait embodiment of the fish hook of this invention.

Referring now more particularly to the characters of reference in the drawing, it will be observed in FIG. 1 that the single bait holding embodiment identified generally as fish lure 2 comprises a conventional single piece metal fish hook 3 having a line loop 4 and a bait or fish engaging barb 5 at opposite ends of a wire member 6 that integrally contains a straight shank section 7 and an arcuate section 8. A bait holding member 9 is made up of two spring clip or clamp members 10 that attach on opposite sides of the wire member 6 by solder or welding to the shank 7 at end 11. The opposite ends 12 of clips 10 are not rigidly attached to the arcuate section 8, but are held in place by spring tension.

Assuming in most instances the bait will be slightly larger than the generally semi-circular portion 13 formed in clip 10, it may be inserted in the opening 14 between the portion 13 and the arcuate section 8 by manually expanding end 12 outwardly and away from wire member 6 and then releasing end 12 and allowing the spring action of clip 12 to cause the portion 13 to clamp the bait against wire member 6. The live bait will thus be securely held in place on the hook 3 without requiring its being pierced by barb 5. Not only will the life of such bait be extended by the employment of this method, but the activity of the bait will be increased in its attempt to get free, and by virtue of the fact that it was not wounded during the baiting operation.

The upper and lower ends 11 and 12 are each curved to generally conform to the wire member 6. This shape assists in the welding or soldering operation performed on end 11 to attach it to shank 7; this shape on end 12 permits it to engage section 8.

Figure 4:
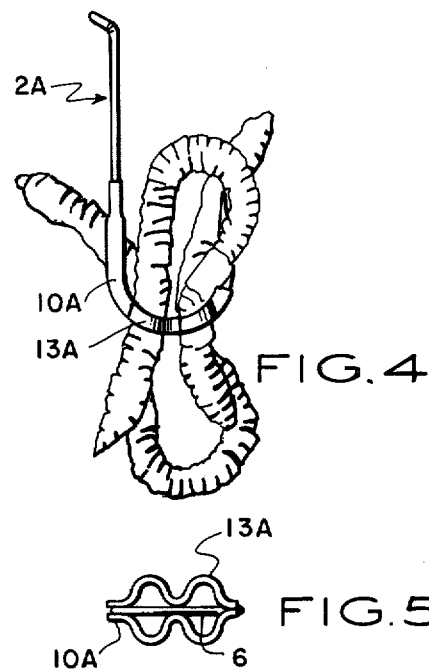
FIG. 4 is a side elevational view of a double bait embodiment of this invention.
Figure 5:
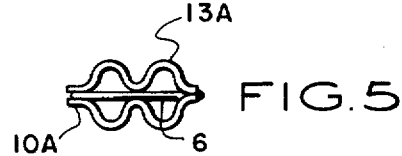
FIG. 5 is a bottom view of the device of FIG. 4.

FIGS. 4 and 5 disclose what is known as a double bait embodiment wherein each spring clip 10a includes two semicircular portions 13a so that when in use a separate bait such as worm shown may be inserted in each side of the complete hook assembly 2a and be held against the central wire member 6.

Figure 6:
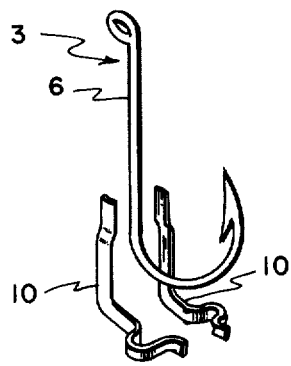
FIG. 6 is an exploded view showing one method of assembly of the device of FIG. 1.
Figure 7:
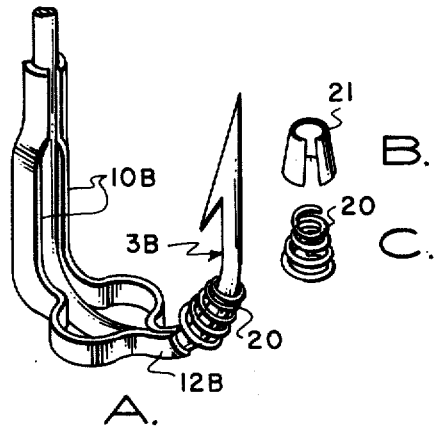
FIG. 7 is a perspective view showing details of assembly of a large hook embodiment of the invention.

FIG. 6 shows the relationship between the fish hook 3 comprising wire member 6 and the individual spring clips 10 that engage the hook to form the embodiment of FIG. 1. FIG. 7 shows a preferred embodiment for use with a larger hook 3b. The spring clips 10b are the same configuration but larger in size than clips 10 and are firmly and securely held in place around hook 3b by a spring 20 that slips over the free ends 12b and by split sleeve 21 that slips over and holds spring 20 in place.

Figure 2:
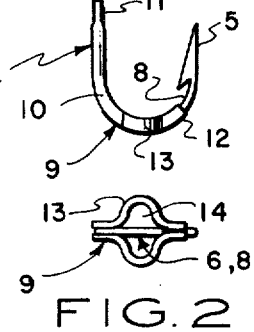
FIG. 2 is a bottom view of the device of FIG. 1.
Figure 3:
FIG. 3 is a view similar to FIG. 1 showing a live insect installed in place and ready for use.
Figure 8:
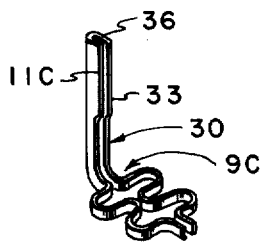
FIG. 8 is a detail view of a snap-on clamp embodiment of the device shown in FIGS. 4 and 5.
Figure 9:
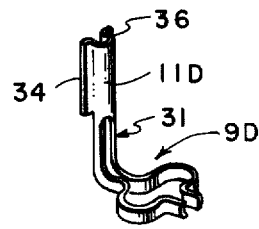
FIG. 9 is a modification of the embodiment shown in FIG. 8.
Figure 10:
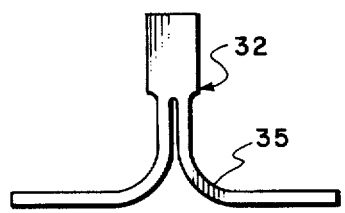
FIG. 10 is a detail plan view of the blank used in making the embodiment of FIGS. 8 and 9.

FIGS. 8-10 show a snap-on clamp 30,31 that may be formed from a single blank of material 32 to have inwardly extending lips 33 on end 11c or outwardly extending lips 34 on end 11d. The projecting arms 35 of blank 32 in FIG. 10 are formed in a manner to produce one or more semi-circular portions similar to those shown at 13 and 13a of FIGS. 2 and 5. This embodiment may be made of plastic with a slight indent or detent 36 in ends 11c or 11d, and this construction will permit the bait holders 9c and 9d to be snapped in place over the hook 3 for rapid assembly (and disassembly).

From the foregoing description and examples, it will be seen that there has been produced a method and a device that substantially fulfills the objects of this invention as set forth herein. The invention is not limited to what is herein shown and described, but is applicable to that which falls within the scope of the appended claims:

I claim:

1. A fish lure comprising a fish hook including a barb, a bait holder for securing live bait to said fish hook independent of said barb, wherein said bait holder comprises:
   a. a snap-on clamp including one end removably attached to said fish hook, and
   b. said clamp including a pair of arms extending from said one end to a second end,
   c. said second end removably engaging said fish hook,
   d. said arms comprising at least one bait engaging portion intermediate said ends.

2. A fish lure as in claim 1, said snap-on clamp comprising a plastic material.

3. A fish lure comprising a fish hook including a barb, a bait holder for securing live bait to said fish hook independent of said barb and comprising:
   a. a spring clip including one end rigidly attached to said fish hook, and
   b. said spring clip including a second end engaging said fish hook, and
   c. removable clamping means for engaging said second end and binding it into secure engagement with said fish hook, and
   d. wherein said removable clamping means comprises a coil spring for circumscribing said second end and a sleeve for circumscribing said coil spring.

4. A fish lure comprising a fish hook including a barb, a bait holder for securing live bait to said fish hook independent of said barb, wherein said bait holder comprises a spring clip attached at one end to said fish hook and defining a bait receiving opening between said clip and said fish hook, and wherein said spring clip defines at least one bait receiving opening on each side of said fish hook.

5. A fish lure as in claim 1, wherein said one end defines a generally U-shaped opening having a detent, and wherein said opening is substantially the size of said fish hook.

* * * * *